US012672103B2

(12) United States Patent
Lei

(10) Patent No.: US 12,672,103 B2
(45) Date of Patent: Jun. 30, 2026

(54) METHOD FOR INDICATING VALIDITY OF REFERENCE SIGNAL TRANSMISSION OCCASION, AND USER EQUIPMENT

(71) Applicant: Spreadtrum Semiconductor (Nanjing) Co., Ltd., Nanjing (CN)

(72) Inventor: Zhenzhu Lei, Nanjing (CN)

(73) Assignee: Spreadtrum Semiconductor (Nanjing) Co., Ltd., Nanjing (CN)

( * ) Notice: Subject to any disclaimer, the term of this patent is extended or adjusted under 35 U.S.C. 154(b) by 365 days.

(21) Appl. No.: 18/262,387

(22) PCT Filed: Jan. 24, 2022

(86) PCT No.: PCT/CN2022/073552
§ 371 (c)(1),
(2) Date: Jul. 21, 2023

(87) PCT Pub. No.: WO2022/156802
PCT Pub. Date: Jul. 28, 2022

(65) Prior Publication Data
US 2024/0098692 A1     Mar. 21, 2024

(30) Foreign Application Priority Data
Jan. 22, 2021    (CN) .......................... 202110089803.9

(51) Int. Cl.
*H04W 68/02* (2009.01)
(52) U.S. Cl.
CPC .................................. *H04W 68/02* (2013.01)
(58) Field of Classification Search
None
See application file for complete search history.

(56) References Cited

U.S. PATENT DOCUMENTS

| | | | | |
|---|---|---|---|---|
| 2007/0049991 A1* | 3/2007 | Klostermann | ..... | A61N 1/37254 |
| | | | | 607/60 |
| 2019/0174466 A1 | 6/2019 | Zhang et al. | | |
| 2024/0073836 A1* | 2/2024 | Liu | ..................... | H04W 56/001 |

FOREIGN PATENT DOCUMENTS

| | | |
|---|---|---|
| CN | 111278107 A | 6/2020 |
| CN | 111385826 A | 7/2020 |
| WO | 2020168330 A1 | 8/2020 |

OTHER PUBLICATIONS

International Search Report (PCT/CN2022/073552); Date of Mailing: Apr. 14, 2022.
On-TRS-design-for-idle/inactive-UEs.
(Continued)

*Primary Examiner* — Frantz Bataille
(74) *Attorney, Agent, or Firm* — Wiersch Law Group

(57) ABSTRACT

Provided is a method for indicating validity of a reference signal transmission occasion, and a user equipment. The method includes: receiving a paging early indication (PEI) of a current paging cycle sent by a network side device. The PEI includes a first bit field and a second bit field. In response to the first bit field being configured to indicate a need to wake up, the second bit field is configured to indicate whether a first reference signal transmission occasion is valid or invalid; or in response to the first bit field being configured to indicate no need to wake up, the second bit field is configured to indicate whether a second reference signal transmission occasion is valid or invalid.

20 Claims, 6 Drawing Sheets

(56)         References Cited

OTHER PUBLICATIONS

Provision-of-TRS-CSI-RS-for-idle-inactive-UEs.
Paging-enhancements-for-idle/inactive-mode-UE-power-saving.
Discussion-on-TRS/CSI-RS-for-idle/inactive-UEs.
First Office Action(CN202110089803.9); Date of Mailing: Mar. 21, 2024.
Paging-enhancement-to-reduce-unnecessary-UE-paging-receptions.

* cited by examiner

METHOD FOR INDICATING VALIDITY OF REFERENCE SIGNAL TRANSMISSION OCCASION, AND USER EQUIPMENT

The present disclosure is a National Phase of International Application No. PCT/CN2022/073552, filed on Jan. 24, 2022, which claims the priority to Chinese Patent Application No. 202110089803.9, filed on Jan. 22, 2021, the contents of which are incorporated herein by reference in their entireties.

TECHNICAL FIELD

The present disclosure relates to the field of communication technologies and, in particular, to a method for indicating validity of a reference signal transmission occasion, and a user equipment (UE).

BACKGROUND

The current approach for reducing energy consumption of a UE in an idle/inactive state is to introduce a reference signal transmission occasion in the idle/inactive state. The reference signal transmission occasion may include a tracking reference signal (TRS) transmission occasion or a channel state information-reference signal (CSI-RS) transmission occasion. Before receiving a paging message, processes of time-frequency synchronization, automatic gain control (AGC), and radio resource management (RRM) measurement by using the synchronization signal block (SSB) and the reference signal transmission occasion are conducted to reduce the number of wake-up times of the UE.

Generally, the UE does not need to listen to paging messages at about 90% of the occasions. However, according to the current 3GPP protocol, the UE needs to perform serving cell measurement during each paging cycle. The 90% probability means that the paging early indication (PEI) received by the UE in the current paging cycle indicates that the UE does not need to listen to the paging message, but the UE still needs to perform subsequent RRM measurement. In this case, it is an urgent problem to reduce the number of wake-up times of the UE. In other words, when the PEI indicates that the UE does not need to listen to the paging message, in order to align the PEI reception and the RRM measurement, it is necessary to introduce a reference signal transmission occasion for the serving cell measurement, so as to reduce the number of wake-up times of the UE.

In the related art, in the idle/inactive state, the network side needs to indicate the validity of the reference signal transmission occasion. To be specific, the UE needs to receive a validity indication for the reference signal transmission occasion from the network side device in advance, to determine whether the subsequent reference signal transmission occasion is valid. The PEI may be used to indicate that the UE needs to wake up to listen to the paging occasion (PO) or to indicate that the UE does not need to wake up and thus does not need to listen to the PO. However, there is no conventional solution in the art for indicating the validity of the reference signal transmission occasion in both scenarios of when the UE needs to wake up and when the UE does not need to wake up.

SUMMARY

In view of this, embodiments of the present disclosure provide a method for indicating validity of a reference signal transmission occasion and a UE, to indicate, by means of a second bit field, the validity of the reference signal transmission occasion in two scenarios of when the UE needs to wake up and when the UE does not need to wake up.

According to a first aspect, embodiments of the present disclosure provide a method for indicating validity of a reference signal transmission occasion, including: receiving a paging early indication (PEI) of a current paging cycle sent by a network side device, the PEI includes a first bit field and a second bit field; and in response to the first bit field being configured to indicate a need to wake up, the second bit field is configured to indicate whether a first reference signal transmission occasion is valid or invalid; or in response to the first bit field being configured to indicate no need to wake up, the second bit field is configured to indicate whether a second reference signal transmission occasion is valid or invalid.

In one or more embodiments, the need to wake up includes a need to listen to a paging occasion (PO) in the current paging cycle, and the first reference signal transmission occasion includes a reference signal transmission occasion corresponding to the PO in the current paging cycle.

In one or more embodiments, the no need to wake up includes no need to listen to a PO in the current paging cycle, and the second reference signal transmission occasion includes a reference signal transmission occasion corresponding to a PEI transmission occasion in the current paging cycle.

In one or more embodiments, the need to wake up includes a need to listen to POs in N paging cycles associated with PEI transmission occasions, and the first reference signal transmission occasion includes reference signal transmission occasions corresponding to the POs in the N paging cycles, where N is an integer greater than or equal to 2.

In one or more embodiments, the no need to wake up includes no need to listen to POs in N paging cycles associated with PEI transmission occasions, and the second reference signal transmission occasion includes reference signal transmission occasions corresponding to the PEI transmission occasions in the N paging cycles, where N is an integer greater than or equal to 2.

In one or more embodiments, the reference signal transmission occasion includes a tracking reference signal (TRS) transmission occasion or a channel state information-reference signal (CSI-RS) transmission occasion.

In one or more embodiments, the reference signal transmission occasion corresponding to the PO is located prior to and closest to the PO; or the reference signal transmission occasion corresponding to the PO is located prior to the PO and closest to a synchronization signal block (SSB) transmission occasion.

In one or more embodiments, the reference signal transmission occasion corresponding to the PEI transmission occasion is located subsequent to and closest to the PEI transmission occasion.

In one or more embodiments, the method further includes: receiving a broadcast message sent by the network side device, and the broadcast message includes the N value.

According to a second aspect, embodiments of the present disclosure provide a method for indicating validity of a reference signal transmission occasion, including: sending a paging early indication (PEI) of a current paging cycle to user equipment (UE), the PEI includes a first bit field and a second bit field; and in response to the first bit field being configured to indicate that the UE needs to wake up, the second bit field is configured to indicate whether a first reference signal transmission occasion is valid or invalid; or in response to the first bit field being configured to indicate that the UE does not need to wake up, the second bit field is used to indicate whether a second reference signal transmission occasion is valid or invalid.

In one or more embodiments, the need to wake up includes a need to listen to a paging occasion (PO) in the current paging cycle, and the first reference signal transmission occasion includes a reference signal transmission occasion corresponding to the PO in the current paging cycle.

In one or more embodiments, the no need to wake up includes no need to listen to a PO in the current paging cycle, and the second reference signal transmission occasion includes a reference signal transmission occasion corresponding to a PEI transmission occasion in the current paging cycle.

In one or more embodiments, the need to wake up includes a need to listen to POs in N paging cycles associated with PEI transmission occasions, and the first reference signal transmission occasion includes reference signal transmission occasions corresponding to the POs in the N paging cycles, where N is an integer greater than or equal to 2.

In one or more embodiments, the no need to wake up includes no need to listen to POs in N paging cycles associated with PEI transmission occasions, and the second reference signal transmission occasion includes reference signal transmission occasions corresponding to the PEI transmission occasions in the N paging cycles, where N is an integer greater than or equal to 2.

According to a third aspect, embodiments of the present disclosure provide a user equipment (UE), including: one or more processors, a memory, and one or more computer programs, where the one or more computer programs are stored in the memory, the one or more computer programs include instructions, and when executed by the UE, the instructions cause the UE to perform the method for indicating validity of a reference signal transmission occasion according to any of the embodiments according to the first aspect.

According to a fourth aspect, the present disclosure provides a network side device, including: one or more processors, a memory, and one or more computer programs, where the one or more computer programs are stored in the memory, the one or more computer programs include instructions, and when executed by the device, the instructions cause the device to perform the method for indicating validity of a reference signal transmission occasion according to any of the embodiments of the second aspect.

According to a fifth aspect, the present disclosure provides a computer readable storage medium, including a stored program, where when being run, the program controls a device of the computer readable storage medium to perform the method for indicating validity of a reference signal transmission occasion according to any of the embodiments of the first aspect or the method for indicating validity of a reference signal transmission occasion according to any of the embodiments of the second aspect.

BRIEF DESCRIPTION OF DRAWINGS

In order to better describe the technical solutions in embodiments of the present disclosure, the following describes the accompanying drawings required for illustrating the embodiments. It is appreciated that, the accompanying drawings in the following description show some embodiments of the present disclosure, and those of ordinary skill in the art may derive other accompanying drawings from these accompanying drawings without creative efforts.

4

Figure 1A:
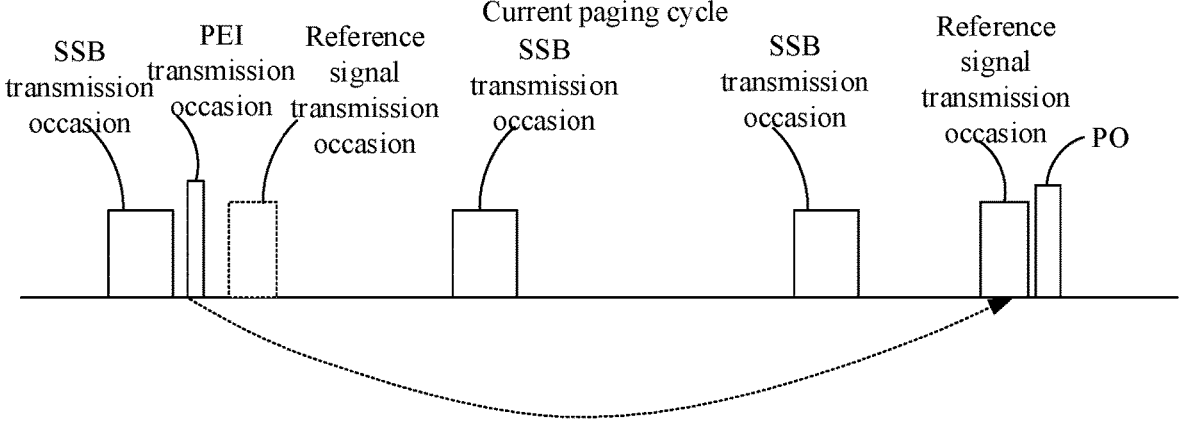
Figure 1B:
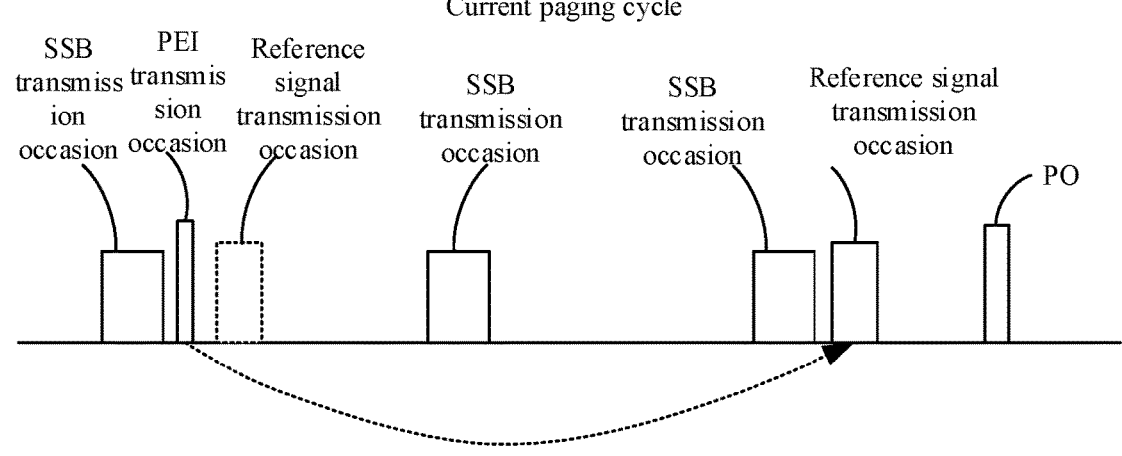
Figure 1C:
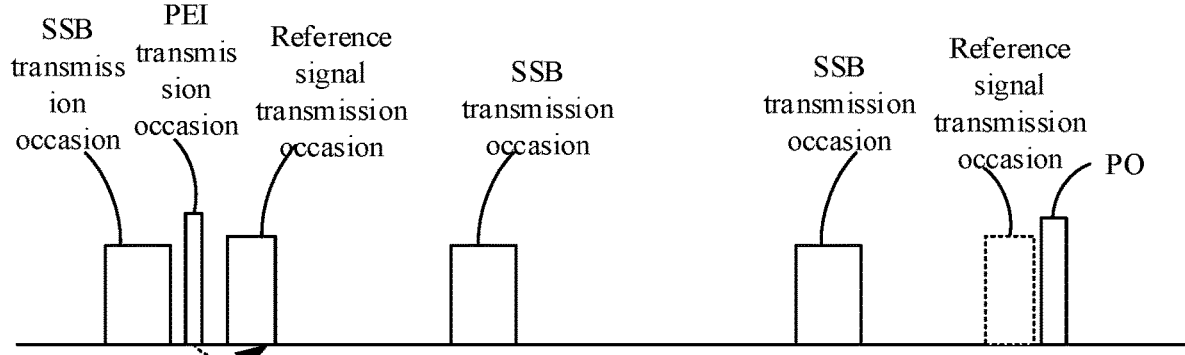
Figure 2A:
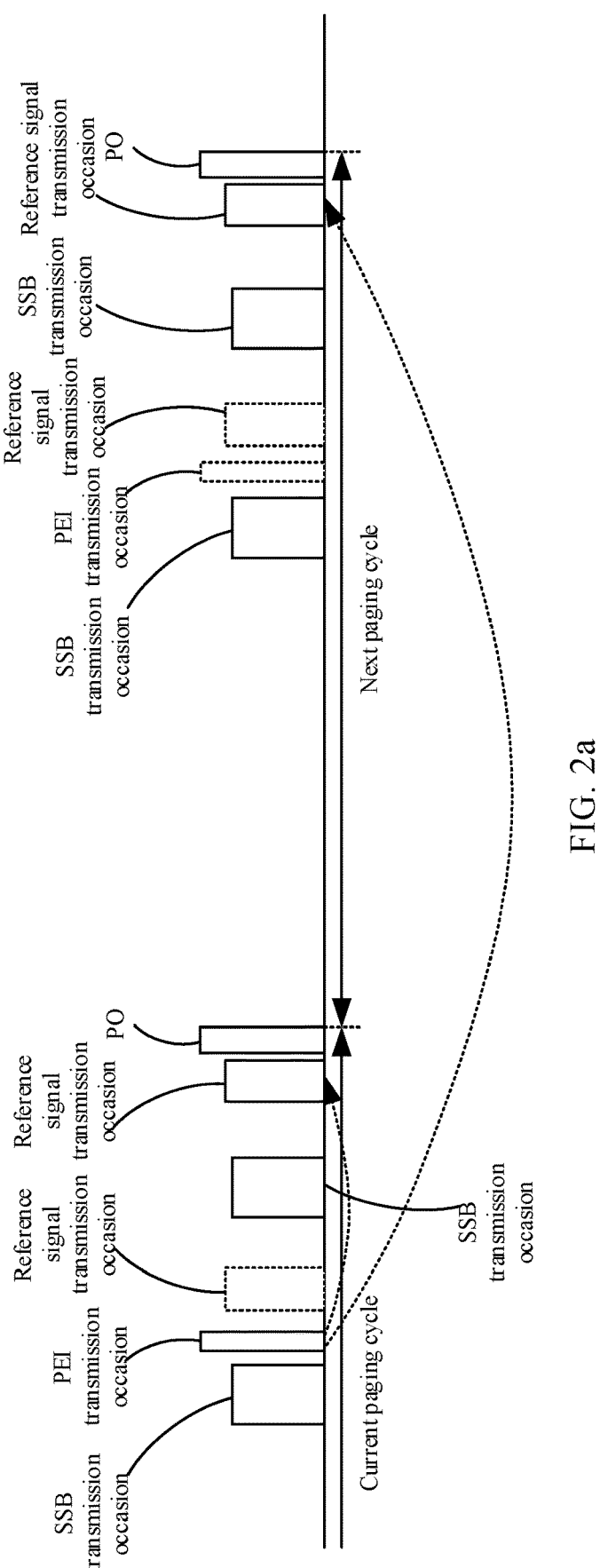
Figure 2B:
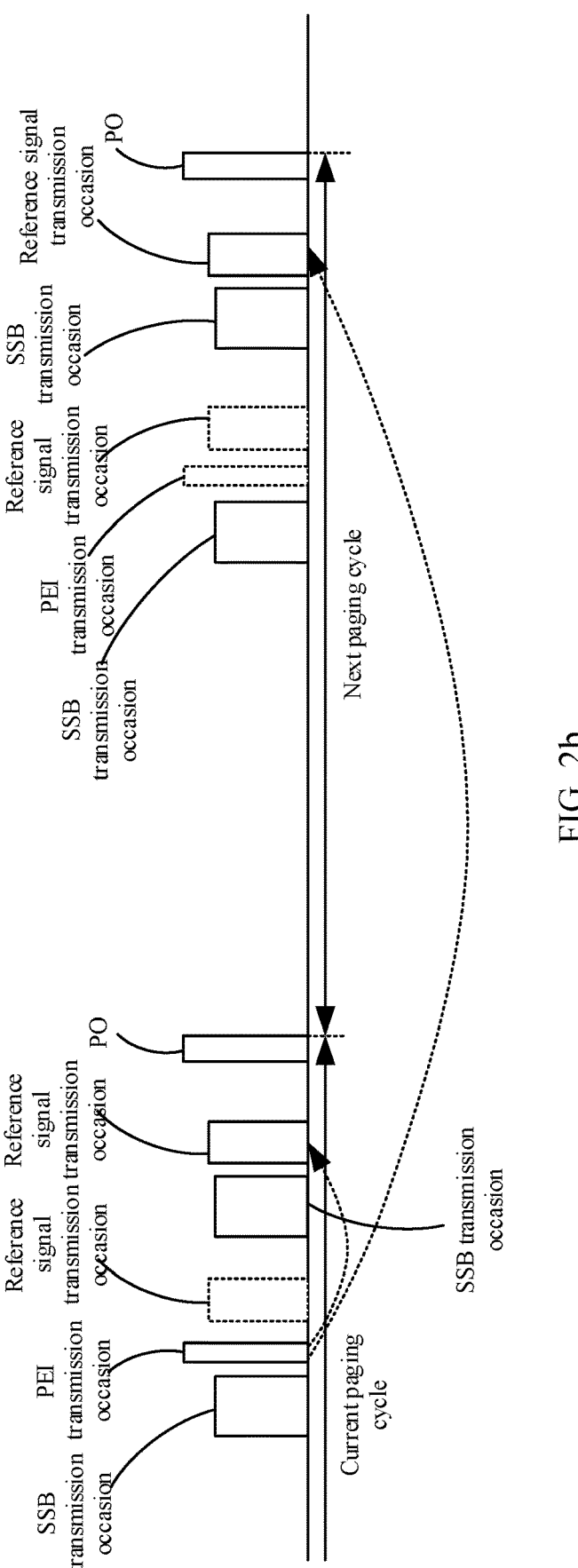
Figure 2C:
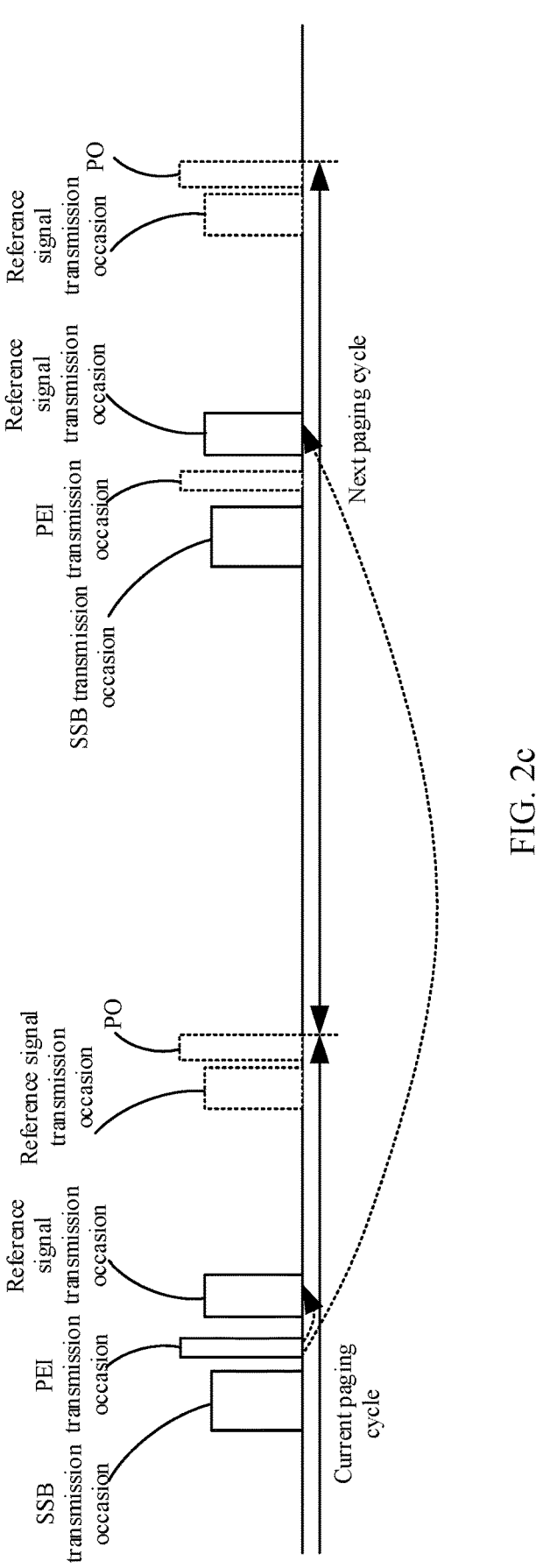
Figure 3:
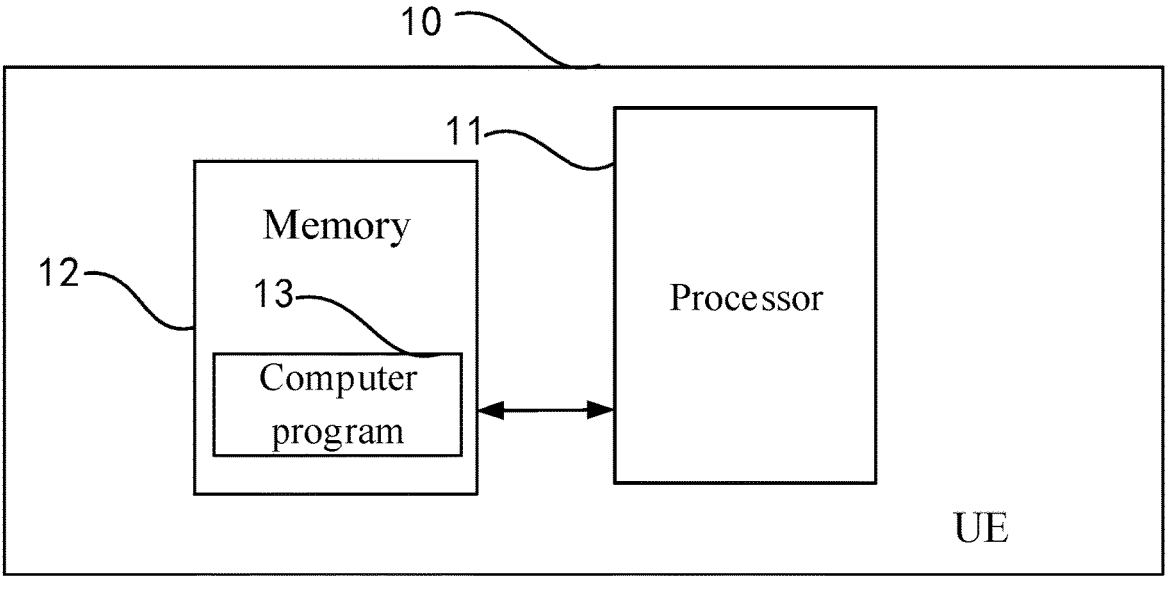
Figure 4:
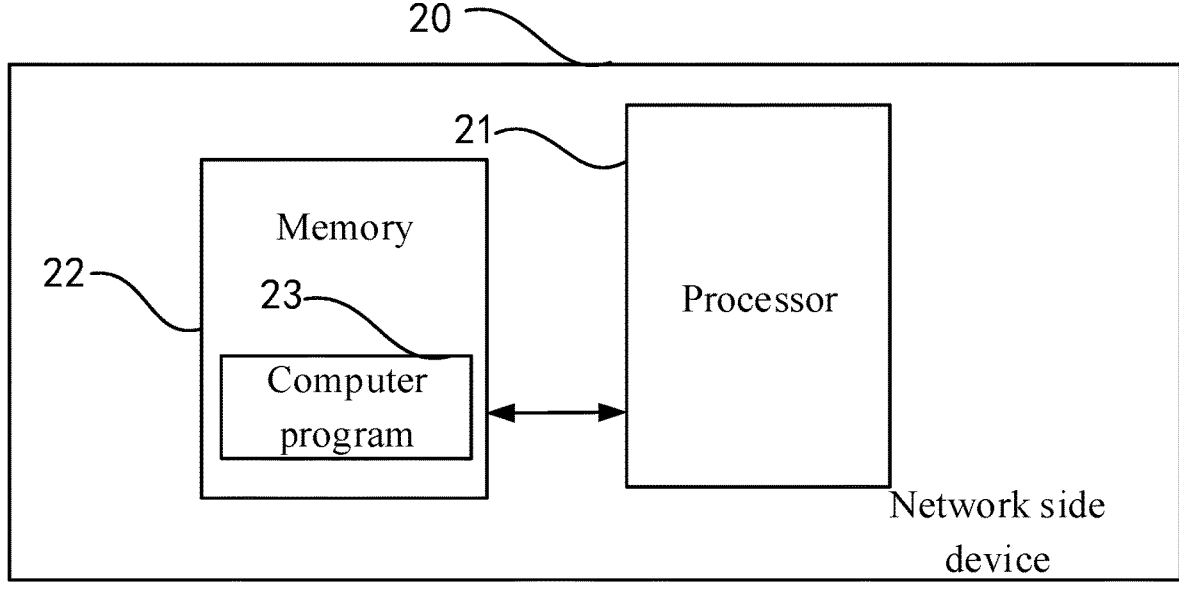

FIG. 1a is a schematic diagram of a method for indicating validity of a reference signal transmission occasion according to one or more embodiments of the present disclosure;

FIG. 1b is another schematic diagram of a method for indicating validity of a reference signal transmission occasion according to one or more embodiments of the present disclosure;

FIG. 1c is another schematic diagram of a method for indicating validity of a reference signal transmission occasion according to one or more embodiments of the present disclosure;

FIG. 2a is a schematic diagram of a method for indicating validity of a reference signal transmission occasion according to one or more embodiments of the present disclosure;

FIG. 2b is another schematic diagram of a method for indicating validity of a reference signal transmission occasion according to one or more embodiments of the present disclosure;

FIG. 2c is another schematic diagram of a method for indicating validity of a reference signal transmission occasion according to one or more embodiments of the present disclosure;

FIG. 3 is a schematic diagram of a UE according to one or more embodiments of the present disclosure; and FIG. 4 is a schematic diagram of a network side device according to one or more embodiments of the present disclosure.

DESCRIPTION OF EMBODIMENTS

For a better understanding of the technical solutions of the present disclosure, the following describes in detail embodiments of the present disclosure with reference to the accompanying drawings.

It should be noted that, the described embodiments are merely some but not all of the embodiments of the present disclosure. All other embodiments obtained by those of ordinary skill in the art based on the embodiments of the present disclosure without creative efforts shall fall within the protection scope of the present disclosure.

Terms in the embodiments of the present disclosure are merely used to describe the specific embodiments, and are not intended to limit the present disclosure. Unless otherwise specified in the context, words, such as "a/an", "the", and "said", in a singular form in the embodiments and appended claims of the present disclosure include plural forms.

It should be understood that the term "and/or" in the present disclosure merely describes associations between associated objects, and it indicates three types of relationships. For example, A and/or B may indicate that A exists alone, A and B coexist, or B exists alone. In addition, the character "/" in the present disclosure generally indicates that the associated objects are in an "or" relationship.

In embodiments of the present disclosure, in the idle state or the inactive state, there are two transmission occasions: a first reference signal transmission occasion and a second reference signal transmission occasion. In some embodiments, the first reference signal transmission occasion includes a reference signal transmission occasion corresponding to a PO in a current paging cycle, and the second reference signal transmission occasion includes a reference signal transmission occasion corresponding to a PEI transmission occasion in the current paging cycle. In some embodiments, the first reference signal transmission occasion includes reference signal transmission occasions corresponding to POs in N paging cycles, and the second reference signal transmission occasion includes reference signal transmission occasions corresponding to PEI transmission occasions in the N paging cycles.

The reference signal may be a TRS or a CSI-RS, and the reference signal transmission occasion may be a TRS transmission occasion or a CSI-RS transmission occasion.

A valid reference signal transmission occasion indicates that the reference signal transmission occasion is available, and an invalid reference signal transmission occasion indicates that the reference signal transmission occasion is not available.

Embodiments of the present disclosure provide a method for indicating validity of a reference signal transmission occasion. The method includes: UE receives a PEI of a current paging cycle sent by a network side device. The PEI includes a first bit field and a second bit field.

If the first bit field is used to indicate that the UE needs to wake up, the second bit field is used to indicate whether a first reference signal transmission occasion is valid or invalid. Alternatively, if the first bit field is used to indicate that the UE does not need to wake up, the second bit field is used to indicate whether a second reference signal transmission occasion is valid or invalid.

The first bit field may be used to indicate whether the UE needs to wake up. For example, indicating whether the UE needs to wake up may include indicating whether the UE needs to listen to a PO in a paging cycle.

In some embodiments, the need to wake up may include a need to listen to a PO in a current paging cycle, and the first bit field may be used to indicate that the UE needs to listen to the PO in the current paging cycle. In this case, the first reference signal transmission occasion may include the reference signal transmission occasion corresponding to the PO in the current paging cycle, and the second bit field is used to indicate validity of the reference signal transmission occasion corresponding to the PO in the current paging cycle. That is, the second bit field is used to indicate whether the reference signal transmission occasion corresponding to the PO in the current paging cycle is valid or invalid.

In some embodiments, no need to wake up may include no need to listen to the PO in the current paging cycle, and the first bit field may be used to indicate that the UE does not need to listen to the PO in the current paging cycle. In this case, the second reference signal transmission occasion may include a reference signal transmission occasion corresponding to a PEI transmission occasion in the current paging cycle, and the second bit field is used to indicate validity of the reference signal transmission occasion corresponding to the PEI transmission occasion in the current paging cycle. That is, the second bit field is used to indicate whether the reference signal transmission occasion corresponding to the PEI transmission occasion in the current paging cycle is valid or invalid.

In some embodiments, the need to wake up may include the need to listen to POs in N paging cycles associated with PEI transmission occasions, and the first bit field may be used to indicate that the UE needs to listen to the POs in the N paging cycles associated with the PEI transmission occasions. In this case, the first reference signal transmission occasion includes reference signal transmission occasions corresponding to the POs in the N paging cycles, and the second bit field is used to indicate validity of the reference signal transmission occasions corresponding to the POs in the N paging cycles. That is, the second bit field is used to indicate whether the reference signal transmission occasions corresponding to the POs in the N paging cycles are valid or invalid. N is an integer greater than or equal to 2.

In some embodiments, no need to wake up may include no need to listen to POs in N paging cycles associated with PEI transmission occasions, and the first bit field may be used to indicate that the UE does not need to listen to the POs in the N paging cycles associated with the PEI transmission occasions. In this case, the second reference signal transmission occasion includes reference signal transmission occasions corresponding to the PEI transmission occasions in the N paging cycles, and the second bit field is used to indicate validity of the reference signal transmission occasions corresponding to the PEI transmission occasions in the N paging cycles. That is, the second bit field is used to indicate whether the reference signal transmission occasions corresponding to the PEI transmission occasions in the N paging cycles are valid or invalid. N is an integer greater than or equal to 2.

The UE receives the PEI of the current paging cycle from the network side device. If the first bit field in the PEI is used to indicate that the UE needs to wake up, the second bit field in the PEI is used to indicate validity of the first reference signal transmission occasion. Alternatively, if the first bit field in the PEI is used to indicate that the UE does not need to wake up, the second bit field is used to indicate validity of the second reference signal transmission occasion. In this way, the second bit field can be used to indicate the validity of the reference signal transmission occasion in two scenarios, that is, when the UE needs to wake up and when the UE does not need to wake up. In the present disclosure, the second bit field can be used to indicate the validity of the reference signal transmission occasion in both scenarios, thereby reducing the bit overheads.

FIG. 1a is a schematic diagram of a method for indicating validity of a reference signal transmission occasion according to one or more embodiments. As shown in FIG. 1a, the method includes: UE receives a PEI of a current paging cycle sent by a network side device. The PEI includes a first bit field and a second bit field.

In response to the first bit field being used to indicate that the UE needs to listen to a PO in the current paging cycle, the second bit field is used to indicate whether a reference signal transmission occasion corresponding to the PO in the current paging cycle is valid or invalid.

In the present disclosure, the network side device may be a base station.

As shown in FIG. 1a, for example, multiple occasions including an SSB transmission occasion, a PEI transmission occasion, a reference signal transmission occasion, an SSB transmission occasion, an SSB transmission occasion, a reference signal transmission occasion, and a PO are set in sequence in the current paging cycle. Among the above occasions, there may be a plurality of SSB transmission occasions. In some embodiments, as shown in FIG. 1a, the reference signal transmission occasion corresponding to the PO is located prior to and closest to the PO.

As shown in FIG. 1a, the UE may determine, based on the first bit field in the received PEI of the current paging cycle, that it needs to listen to the PO in the current paging cycle. In other words, the first bit field in the PEI indicates that the UE needs to listen to the PO in the current paging cycle.

If the network side device indicates, by means of the first bit field in the PEI, that the UE needs to listen to the PO in the current paging cycle, the network side device further needs to indicate to the UE the validity of the reference signal transmission occasion. The second bit field is set in the PEI to indicate whether the reference signal transmission occasion corresponding to the PO in the current paging cycle is valid or invalid. As shown in FIG. 1a, the reference signal transmission occasion corresponding to the PO is the transmission occasion located prior to and closest to the PO.

Since the second bit field in the PEI is used to indicate the validity of the reference signal transmission occasion corresponding to the PO in the current paging cycle, the reference signal transmission occasion corresponding to the PEI transmission occasion is invalid by default in this case. As shown in FIG. 1a, the reference signal transmission occasion corresponding to the PEI transmission occasion is located subsequent to and closest to the PEI transmission occasion. That is, the reference signal transmission occasion located subsequent to and closest to the PEI transmission occasion in FIG. 1a, as indicated by the dashed box, is invalid by default.

In some embodiments, the first bit field may be 1 bit. For example, when the first bit field is 1, it indicates that the UE needs to listen to the PO in the current paging cycle; and when the first bit field is 0, it indicates that the UE does not need to listen to the PO in the current paging cycle.

In some embodiments, the second bit field may be 1 bit. For example, when the second bit field is 1, it indicates that the reference signal transmission occasion is valid; and when the second bit field is 0, it indicates that the reference signal transmission occasion is invalid.

FIG. 1b is another schematic diagram of a method for indicating validity of a reference signal transmission occasion according to one or more embodiments of the present disclosure. As shown in FIG. 1b, the method for indicating validity of a reference signal transmission occasion shown in FIG. 1b differs from FIG. 1a in that the reference signal transmission occasion corresponding to the PO is located prior to and closest to the SSB transmission occasion.

For other descriptions, please refer the above description of the method for indicating validity of a reference signal transmission occasion shown in FIG. 1a. Details are not repeated herein.

FIG. 1c is another schematic diagram of a method for indicating validity of a reference signal transmission occasion according to one or more embodiments of the present disclosure. As shown in FIG. 1c, the method includes: UE receives a PEI of a current paging cycle sent by a network side device. The PEI includes a first bit field and a second bit field.

In response to the first bit field being used to indicate that the UE does not need to listen to a PO in the current paging cycle, the second bit field is used to indicate whether a reference signal transmission occasion corresponding to a PEI transmission occasion in the current paging cycle is valid or invalid.

As shown in FIG. 1c, for example, multiple occasions including an SSB transmission occasion, a PEI transmission occasion, a reference signal transmission occasion, an SSB transmission occasion, an SSB transmission occasion, a reference signal transmission occasion, and a PO are set in sequence in the current paging cycle. Among the above occasions, there may be a plurality of SSB transmission occasions. In some embodiments as shown in FIG. 1c, the reference signal transmission occasion corresponding to the PEI transmission occasion is located subsequent to and closest to the PEI transmission occasion.

As shown in FIG. 1c, the UE may determine, based on the first bit field in the received PEI of the current paging cycle, that it does not need to listen to the PO in the current paging cycle. In other words, the first bit field in the PEI may indicate that the UE does not need to listen to the PO in the current paging cycle.

If the network side device indicates, by means of the first bit field in the PEI, that the UE does not need to listen to the PO in the current paging cycle, the network side device further needs to indicate to the UE the validity of the reference signal transmission occasion. The second bit field is set in the PEI to indicate whether the reference signal transmission occasion corresponding to the PEI transmission occasion in the current paging cycle is valid or invalid. As shown in FIG. 1c, the reference signal transmission occasion corresponding to the PEI transmission occasion is the transmission occasion located subsequent to and closest to the PEI transmission occasion.

Since the second bit field in the PEI is used to indicate the validity of the reference signal transmission occasion corresponding to the PEI transmission occasion in the current paging cycle, the reference signal transmission occasion corresponding to the PO is invalid by default in this case. As shown in FIG. 1c, the reference signal transmission occasion corresponding to the PO is located prior to the PO and closest to the PO transmission occasion. That is, the reference signal transmission occasion located prior to the PO and closest to the PO in FIG. 1c, as indicated by the dashed box, is invalid by default.

In some embodiments, the first bit field may be 1 bit. For example, when the first bit field is 1, it indicates that the UE needs to listen to the PO in the current paging cycle; and when the first bit field is 0, it indicates that the UE does not need to listen to the PO in the current paging cycle.

In some embodiments, the second bit field may be 1 bit. For example, when the second bit field is 1, it indicates that the reference signal transmission occasion is valid; and when the second bit field is 0, it indicates that the reference signal transmission occasion is invalid.

In the present disclosure, in the idle state or the inactive state, the UE may perform time-frequency synchronization, AGC, and RRM measurement for the serving cell by using one or more SSBs. In the process of performing time-frequency synchronization, AGC, or RRM measurement, the UE is woken up frequently, which increases the power consumption of the UE. To solve the above problem, time-frequency synchronization, AGC, and RRM measurement may be aligned by using the TRS or the CSI-RS, to reduce the number of wake-up times of the UE, thus reducing the power consumption of the UE. The second bit field can be used to indicate the validity of the reference signal transmission occasion in both scenarios, that is, when the UE needs to and does not need to listen to the corresponding PO, thus reducing the power consumption of the UE.

The UE receives the PEI of the current paging cycle sent by the network side device. If the first bit field in the PEI is used to indicate the need to listen to the PO in the current paging cycle, the second bit field in the PEI is used to indicate whether the reference signal transmission occasion corresponding to the PO in the current paging cycle is valid or invalid. Alternatively, if the first bit field in the PEI is used to indicate no need to listen to the PO in the current paging cycle, the second bit field in the PEI is used to indicate whether the reference signal transmission occasion corresponding to the PEI transmission occasion in the current paging cycle is valid or invalid. In this way, the second bit field can be used to indicate the validity of the reference signal transmission occasion in two scenarios, that is, when the UE needs to listen to the PO and when the UE does not need to listen to the PO. The second bit field can be used to indicate the validity of the reference signal transmission occasion in both scenarios, thereby reducing the bit overheads.

FIG. 2a is a schematic diagram of a method for indicating validity of a reference signal transmission occasion according to one or more embodiments of the present disclosure. As shown in FIG. 2a, the method includes: UE receives a PEI of a current paging cycle sent by a network side device. The PEI includes a first bit field and a second bit field.

In response to the first bit field being used to indicate that the UE needs to listen to POs in N paging cycles associated with PEI transmission occasions, the second bit field is used to indicate that whether reference signal transmission occasions corresponding to the POs in the N paging cycles are valid or invalid.

N is an integer greater than or equal to 2. As shown in FIG. 2a, in some embodiments, N is 2. That is, the second bit field is used to indicate whether reference signal transmission occasions corresponding to POs in two paging cycles are valid or invalid. The two paging cycles may include a current paging cycle and a next paging cycle.

In some embodiments, N may be set by a higher layer of the network side device. The UE may receive a broadcast message including the N value from the network side device, such that the UE can obtain the N value.

As shown in FIG. 2a, for example, multiple occasions including an SSB transmission occasion, a PEI transmission occasion, a reference signal transmission occasion, an SSB transmission occasion, a reference signal transmission occasion, and a PO are sequentially set in the current paging cycle. In addition, an SSB transmission occasion, a PEI transmission occasion, a reference signal transmission occasion, an SSB transmission occasion, a reference signal transmission occasion, and a PO are sequentially set in the next paging cycle. In the current paging cycle, the reference signal transmission occasion indicated by the dashed box is invalid. In the next paging cycle, the PEI transmission occasion and the reference signal transmission occasion indicated by the dashed boxes are invalid. In some embodiments, as shown in FIG. 2a, the reference signal transmission occasion corresponding to the PO in the current paging cycle is located prior to and closest to the PO, and the reference signal transmission occasion corresponding to the PO in the next paging cycle is located prior to and closest to the PO.

As shown in FIG. 2a, the UE may determine, based on the first bit field in the received PEI of the current paging cycle, that it needs to listen to the POs in the N paging cycles associated with the PEI transmission occasions. In other words, the first bit field in the PEI indicates that the UE needs to listen to the POs in the N paging cycles associated with the PEI transmission occasions.

If the network side device indicates, by means of the first bit field in the PEI, that the UE needs to listen to the POs in the N paging cycles associated with the PEI transmission occasions, the network side device further needs to indicate to the UE the validity of the reference signal transmission occasions. The second bit field is set in the PEI to indicate whether the reference signal transmission occasions corresponding to the POs in the N paging cycles associated with the PEI transmission occasions are valid or invalid. As shown in FIG. 2a, the reference signal transmission occasion corresponding to the PO is the transmission occasion located prior to and closest to the PO.

Since the second bit field in the PEI is used to indicate the validity of the reference signal transmission occasions corresponding to the POs in the N paging cycles associated with the PEI transmission occasions, the reference signal transmission occasions corresponding to the PEI transmission occasions are invalid by default in this case. As shown in FIG. 2a, the reference signal transmission occasion corresponding to the PEI transmission occasion is located subsequent to and closest to the PEI transmission occasion. That is, the reference signal transmission occasion located subsequent to and closest to the PEI transmission occasion in FIG. 2a, as indicated by the dashed box, is invalid by default.

In some embodiments, the first bit field may be 1 bit. For example, when the first bit field is 1, it indicates that the UE needs to listen to the POs in the N paging cycles associated with the PEI transmission occasions; and when the first bit field is 0, it indicates that the UE does not need to listen to the POs in the N paging cycles associated with the PEI transmission occasions.

In some embodiments, the second bit field may be 1 bit. For example, when the second bit field is 1, it indicates that the reference signal transmission occasions are valid; and when the second bit field is 0, it indicates that the reference signal transmission occasions are invalid.

FIG. 2b is another schematic diagram of a method for indicating validity of a reference signal transmission occasion according to one or more embodiments of the present disclosure. As shown in FIG. 2b, the method for indicating validity of a reference signal transmission occasion shown in FIG. 2b differs from FIG. 2a in that the reference signal transmission occasion corresponding to the PO is located prior to the PO and closest to the SSB transmission occasion.

For other descriptions, please refer the above description of the method for indicating validity of a reference signal transmission occasion shown in FIG. 2a. Details are not repeated herein.

FIG. 2c is another schematic diagram of a method for indicating validity of a reference signal transmission occasion according to one or more embodiments of the present disclosure. As shown in FIG. 2c, the method includes: UE receives a PEI of a current paging cycle sent by a network side device. The PEI includes a first bit field and a second bit field.

In response to the first bit field being used to indicate that the UE does not need to listen to POs in N paging cycles associated with PEI transmission occasions, the second bit field is used to indicate whether reference signal transmission occasions corresponding to the PEI transmission occasions in the N paging cycles are valid or invalid.

N is an integer greater than or equal to 2. As shown in FIG. 2c, in some embodiments, N is 2. That is, the second bit field is used to indicate whether the reference signal transmission occasion corresponding to POs in two paging cycles are valid or invalid. The two paging cycles may include a current paging cycle and a next paging cycle.

In some embodiments, N may be set by a higher layer of the network side device. The UE may receive a broadcast message including the N value from the network side device, such that the UE can obtain the N value.

As shown in FIG. 2c, for example, multiple occasions including an SSB transmission occasion, a PEI transmission occasion, a reference signal transmission occasion, a reference signal transmission occasion, and a PO are sequentially set in the current paging cycle. In addition, an SSB transmission occasion, a PEI transmission occasion, a reference signal transmission occasion, a reference signal transmission occasion, and a PO are sequentially set in the next paging cycle. In the current paging cycle, the reference signal transmission occasion and the PO indicated by the dashed boxes are invalid. In the next paging cycle, the PEI transmission occasion, the reference signal transmission occasion, and the PO indicated by the dashed boxes are invalid.

In some embodiments, as shown in FIG. 2c, the reference signal transmission occasion corresponding to the PEI transmission occasion in the current paging cycle is located subsequent to and closest to the PEI transmission occasion, and the reference signal transmission occasion corresponding to the PEI transmission occasion in the next paging cycle is located subsequent to and closest to the PEI transmission occasion.

As shown in FIG. 2c, the UE may determine, based on the first bit field in the received PEI of the current paging cycle, that it does not need to listen to the POs in the N paging cycles associated with the PEI transmission occasions. In other words, the first bit field in the PEI indicates that the UE does not need to listen to the POs in the N paging cycles associated with the PEI transmission occasions.

If the network side device indicates, by means of the first bit field in the PEI, that the UE does not need to listen to the POs in the N paging cycles associated with the PEI transmission occasions, the network side device further needs to indicate to the UE the validity of the reference signal transmission occasions. The second bit field is set in the PEI to indicate whether the reference signal transmission occasions corresponding to the PEI transmission occasions in the N paging cycles are valid or invalid. As shown in FIG. 2c, the reference signal transmission occasion corresponding to the PEI transmission occasion is the transmission occasion located subsequent to and closest to the PEI transmission occasion.

Since the second bit field in the PEI is used to indicate the validity of the reference signal transmission occasions corresponding to the POs in the N paging cycles associated with the PEI transmission occasions, the reference signal transmission occasions corresponding to the PO are invalid by default in this case. As shown in FIG. 2c, the reference signal transmission occasion corresponding to the PO is located prior to and closest to the PO, that is, the reference signal transmission occasion located before the PO and closest to the PO in FIG. 2c, as indicated by the dashed box, is invalid by default.

In some embodiments, the first bit field may be 1 bit. For example, when the first bit field is 1, it indicates that the UE needs to listen to the POs in the N paging cycles associated with the PEI transmission occasions; and when the first bit field is 0, it indicates that the UE does not need to listen to the POs in the N paging cycles associated with the PEI transmission occasions.

In some embodiments, the second bit field may be 1 bit. For example, when the second bit field is 1, it indicates that the reference signal transmission occasions are valid; and when the second bit field is 0, it indicates that the reference signal transmission occasions are invalid.

In the present disclosure, in the idle state or the inactive state, the UE may perform time-frequency synchronization, AGC, and RRM measurement for the serving cell by using one or more SSBs. In the process of performing time-frequency synchronization, AGC, or RRM measurement, the UE is woken up frequently, which increases the power consumption of the UE. To solve the above problem, time-frequency synchronization, AGC, and RRM measurement may be aligned by using the TRS or the CSI-RS, to reduce the number of wake-up times of the UE, thus reducing the power consumption of the UE. The validity of the reference signal transmission occasions can be indicated in both scenarios. That is, when the UE needs to listen to the POs and does not need to listen to the POs, thus reducing the power consumption of the UE.

In the present disclosure, the UE receives the PEI of the current paging cycle sent by the network side device. If the first bit field in the PEI is used to indicate the need to listen to the POs in the N paging cycles associated with the PEI transmission occasions, the second bit field in the PEI is used to indicate whether the reference signal transmission occasions corresponding to the POs in the N paging cycles are valid or invalid. Alternatively, if the first bit field in the PEI is used to indicate no need to listen to the POs in the N paging cycles associated with the PEI transmission occasions, the second bit field in the PEI is used to indicate whether the reference signal transmission occasions corresponding to the PEI transmission occasions in the N paging cycles are valid or invalid. In this way, the second bit field can be used to indicate the validity of the reference signal transmission occasions in both scenarios, that is, when the UE needs to listen to the POs and when the UE does not need to listen to the POs. The second bit field can be used to indicate the validity of the reference signal transmission occasion in both scenarios, thereby reducing the bit overheads.

Some embodiments of the present disclosure provide a computer-readable storage medium. The computer-readable storage medium includes a stored program, and the program is run to control a device where the computer-readable storage medium is located to implement the above method for indicating validity of a reference signal transmission occasion.

Some embodiments of the present disclosure provide a UE, including: one or more processors, a memory, and one or more computer programs. The one or more computer programs are stored in the memory, and the one or more computer programs include instructions. When executed by the UE, the instructions cause the UE to perform the above method for indicating validity of a reference signal transmission occasion.

FIG. 3 is a schematic diagram of UE according to one or more embodiments of the present disclosure. As shown in FIG. 3, the UE 10 includes: a processor 11, a memory 12, and a computer program 13 stored in the memory 11 and runnable on the processor 11. The computer program 13, when executed by the processor 11, implements the above method for indicating validity of a reference signal transmission occasion in the embodiments. Details are not described herein to avoid repetition.

The UE 10 may include, but not limited to, the processor 11 and the memory 12. Those skilled in the art can understand that FIG. 3 shows only an example of the UE 10, does not constitute any limitation to the UE 10, and may include more or less components than those shown in the figure, a combination of some components, or different components. For example, the user equipment may further include input and output devices, a network access device, and a bus.

The processor 11 may be a central processing unit (CPU), and may alternatively be another general-purpose processor, a digital signal processor (DSP), an application specific integrated circuit (ASIC), a field-programmable gate array (FPGA) or another programmable logic device, a discrete gate, a transistor logic device, a discrete hardware component, or the like. The general-purpose processor may be a microprocessor, or the processor may be any conventional processor.

The memory 12 may be an internal storage unit of the UE 10, such as a hard disk or a memory of the UE 10. The memory 12 may alternatively be an external storage device of the UE 10, such as a plug-in hard disk, a smart media card (SMC), a secure digital (SD) card, or a flash card that is equipped on the UE 10. Further, the memory 12 may include both an internal storage unit and an external storage device of the UE 10. The memory 12 is configured to store the computer program and other programs and data required by the user equipment. The memory 12 may also be configured to temporarily store data that has been output or will be output.

Embodiments of the present disclosure provide a network side device, including: one or more processors, a memory, and one or more computer programs. The one or more computer programs are stored in the memory, and the one or more computer programs include instructions. When executed by the device, the instructions cause the device to perform the above method for indicating validity of a reference signal transmission occasion.

FIG. 4 is a schematic diagram of a network side device according to one or more embodiments of the present disclosure. As shown in FIG. 4, the network side device 20 includes: a processor 21, a memory 22, and a computer program 23 stored in the memory 22 and runnable on the processor 21. The computer program 23, when executed by the processor 21, implements the above method for indicating validity of a reference signal transmission occasion in the embodiments. Details are not described herein to avoid repetition.

The network side device 20 may include, but not limited to, the processor 21 and the memory 22. Those skilled in the art can understand that FIG. 4 shows only an example of the network side device 20, does not constitute any limitation to the network side device 20, and may include more or less components than those shown in the figure, a combination of some components, or different components. For example, the network side device may also include input and output devices, a network access device, and a bus.

The processor 21 may be a CPU, and may alternatively be another general-purpose processor, a DSP, an ASIC, an FPGA or another programmable logic device, a discrete gate, a transistor logic device, a discrete hardware component, or the like. The general-purpose processor may be a microprocessor, or the processor may be any conventional processor.

The memory 22 may be an internal storage unit of the network side device 20, such as a hard disk or a memory of the network side device 20. The memory 22 may alternatively be an external storage device of the network side device 20, such as a plug-in hard disk, an SMC, an SD card, or a flash card that is equipped on the network side device 20. Further, the memory 22 may include both an internal storage unit and an external storage device of the network side device 20. The memory 22 is configured to store the computer program and other programs and data required by the network side device. The memory 22 may also be configured to temporarily store data that has been output or will be output.

Those skilled in the art can understand that, for convenience and brevity of description, reference may be made to corresponding processes in the foregoing method embodiments for specific working processes of the foregoing systems, apparatuses, and units. Details are not described herein again.

In several embodiments provided herein, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separated. Parts shown as units may or may not be physical units, which may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware plus software functional units.

The integrated unit implemented in the form of a software functional unit may be stored in a computer readable storage medium. The software functional unit is stored in a storage medium and includes instructions to cause a computer device (which may be a personal computer, a server, a network device, or the like) or a processor to perform some of the steps of the methods described in the embodiments of the present disclosure. The computer-readable storage medium includes any medium capable of storing program code, such as a USB flash disk, a mobile hard disk, a Read-Only Memory (ROM), a Random Access Memory (RAM), a magnetic disk, or an optical disk.

The above descriptions are merely preferred embodiments of the present disclosure and are not intended to limit the present disclosure. Any modification, equivalent replacement and improvement within the spirit and principle of the present disclosure shall be included within the protection scope of the present disclosure.

What is claimed is:

1. A method for indicating validity of a reference signal transmission occasion, comprising:

receiving a paging early indication (PEI) of a current paging cycle sent by a network side device, wherein the PEI comprises a first bit field and a second bit field; and in response to the first bit field being configured to indicate a need to wake up, the second bit field is configured to indicate whether a first reference signal transmission occasion is valid or invalid; or in response to the first bit field being configured to indicate no need to wake up, the second bit field is configured to indicate whether a second reference signal transmission occasion is valid or invalid, wherein the first reference signal transmission occasion comprises a reference signal transmission occasion corresponding to a paging occasion (PO) in at least one paging cycle, and the second reference signal transmission occasion comprises a reference signal transmission occasion corresponding to a PEI transmission occasion in at least one paging cycle.

2. The method according to claim 1, wherein the need to wake up comprises a need to listen to a paging occasion (PO) in the current paging cycle, and the first reference signal transmission occasion comprises a reference signal transmission occasion corresponding to the PO in the current paging cycle.

3. The method according to claim 1, wherein the no need to wake up comprises no need to listen to a PO in the current paging cycle, and the second reference signal transmission occasion comprises a reference signal transmission occasion corresponding to a PEI transmission occasion in the current paging cycle.

4. The method according to claim 1, wherein the need to wake up comprises a need to listen to POs in N paging cycles associated with PEI transmission occasions, and the first reference signal transmission occasion comprises reference signal transmission occasions corresponding to the POs in the N paging cycles, where N is an integer greater than or equal to 2.

5. The method according to claim 1, wherein the no need to wake up comprises no need to listen to POs in N paging cycles associated with PEI transmission occasions, and the second reference signal transmission occasion comprises reference signal transmission occasions corresponding to the PEI transmission occasions in the N paging cycles, where N is an integer greater than or equal to 2.

6. The method according to claim 1, wherein the reference signal transmission occasion comprises a tracking reference signal (TRS) transmission occasion or a channel state information-reference signal (CSI-RS) transmission occasion.

7. The method according to claim 2, wherein the reference signal transmission occasion corresponding to the PO is located prior to and closest to the PO; or the reference signal transmission occasion corresponding to the PO is located prior to the PO and closest to a synchronization signal block (SSB) transmission occasion.

8. The method according to claim 3, wherein the reference signal transmission occasion corresponding to the PEI transmission occasion is located subsequent to and closest to the PEI transmission occasion.

9. The method according to claim 4, further comprising:
  receiving a broadcast message sent by the network side device, wherein the broadcast message comprises the N value.

10. A user equipment (UE), comprising:
  at least one processor; and
  a memory configured to store instructions executable by the at least one processor;
  wherein the instructions cause the at least one processor to:
  receive a paging early indication (PEI) of a current paging cycle sent by a network side device, wherein the PEI comprises a first bit field and a second bit field; and
  in response to the first bit field being configured to indicate a need to wake up, the second bit field is configured to indicate whether a first reference signal transmission occasion is valid or invalid; or
  in response to the first bit field being configured to indicate no need to wake up, the second bit field is configured to indicate whether a second reference signal transmission occasion is valid or invalid,
  wherein the first reference signal transmission occasion comprises a reference signal transmission occasion corresponding to a paging occasion (PO) in at least one paging cycle, and the second reference signal transmission occasion comprises a reference signal transmission occasion corresponding to a PEI transmission occasion in at least one paging cycle.

11. A non-transitory computer readable storage medium, wherein the computer-readable storage medium stores computer program instructions thereon, the computer program instructions, when being executed by a processor, are configured to:

receive a paging early indication (PEI) of a current paging cycle sent by a network side device, wherein the PEI comprises a first bit field and a second bit field; and
in response to the first bit field being configured to indicate a need to wake up, the second bit field is configured to indicate whether a first reference signal transmission occasion is valid or invalid; or
in response to the first bit field being configured to indicate no need to wake up, the second bit field is configured to indicate whether a second reference signal transmission occasion is valid or invalid,
  wherein the first reference signal transmission occasion comprises a reference signal transmission occasion corresponding to a paging occasion (PO) in at least one paging cycle, and the second reference signal transmission occasion comprises a reference signal transmission occasion corresponding to a PEI transmission occasion in at least one paging cycle.

12. The method according to claim 4, wherein the reference signal transmission occasion corresponding to the PO is located prior to and closest to the PO; or the reference signal transmission occasion corresponding to the PO is located prior to the PO and closest to a synchronization signal block (SSB) transmission occasion.

13. The method according to claim 5, wherein the reference signal transmission occasion corresponding to the PEI transmission occasion is located subsequent to and closest to the PEI transmission occasion.

14. The method according to claim 5, further comprising:
  receiving a broadcast message sent by the network side device, wherein the broadcast message comprises the N value.

15. The UE according to claim 10, wherein the need to wake up comprises a need to listen to a paging occasion (PO) in the current paging cycle, and the first reference signal transmission occasion comprises a reference signal transmission occasion corresponding to the PO in the current paging cycle, or
  wherein the no need to wake up comprises no need to listen to a PO in the current paging cycle, and the second reference signal transmission occasion comprises a reference signal transmission occasion corresponding to a PEI transmission occasion in the current paging cycle.

16. The UE according to claim 10, wherein the need to wake up comprises a need to listen to POs in N paging cycles associated with PEI transmission occasions, and the first reference signal transmission occasion comprises reference signal transmission occasions corresponding to the POs in the N paging cycles, where N is an integer greater than or equal to 2, or
  wherein the need to wake up comprises a need to listen to POs in N paging cycles associated with PEI transmission occasions, and the first reference signal transmission occasion comprises reference signal transmission occasions corresponding to the POs in the N paging cycles, where Nis an integer greater than or equal to 2.

17. The UE according to claim 15, wherein the reference signal transmission occasion corresponding to the PO is located prior to and closest to the PO; or the reference signal transmission occasion corresponding to the PO is located prior to the PO and closest to a synchronization signal block (SSB) transmission occasion, or
  wherein the reference signal transmission occasion corresponding to the PEI transmission occasion is located subsequent to and closest to the PEI transmission occasion.

18. The non-transitory computer readable storage medium according to claim 11, wherein the need to wake up comprises a need to listen to a paging occasion (PO) in the current paging cycle, and the first reference signal transmission occasion comprises a reference signal transmission occasion corresponding to the PO in the current paging cycle, or wherein the no need to wake up comprises no need to listen to a PO in the current paging cycle, and the second reference signal transmission occasion comprises a reference signal transmission occasion corresponding to a PEI transmission occasion in the current paging cycle.

19. The non-transitory computer readable storage medium according to claim 11, wherein the need to wake up comprises a need to listen to POs in N paging cycles associated with PEI transmission occasions, and the first reference signal transmission occasion comprises reference signal transmission occasions corresponding to the POs in the N paging cycles, where N is an integer greater than or equal to 2, or wherein the need to wake up comprises a need to listen to POs in N paging cycles associated with PEI transmission occasions, and the first reference signal transmission occasion comprises reference signal transmission occasions corresponding to the POs in the N paging cycles, where N is an integer greater than or equal to 2.

20. The non-transitory computer readable storage medium according to claim 18, wherein the reference signal transmission occasion corresponding to the PO is located prior to and closest to the PO; or the reference signal transmission occasion corresponding to the PO is located prior to the PO and closest to a synchronization signal block (SSB) transmission occasion, or wherein the reference signal transmission occasion corresponding to the PEI transmission occasion is located subsequent to and closest to the PEI transmission occasion.

* * * * *